United States Patent
Shi

(10) Patent No.: US 10,003,382 B1
(45) Date of Patent: Jun. 19, 2018

(54) COMMUNICATION BETWEEN A VEHICLE AND A GROUND TERMINAL OVER A GROUND POWER LINE

(71) Applicant: The Boeing Company, Chicago, IL (US)

(72) Inventor: Fong Shi, Bellevue, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days. days.

(21) Appl. No.: 15/676,198

(22) Filed: Aug. 14, 2017

(51) Int. Cl.
*H04B 3/54* (2006.01)
*H04B 7/185* (2006.01)

(52) U.S. Cl.
CPC ........... *H04B 3/54* (2013.01); *H04B 7/18506* (2013.01); *H04B 2203/5466* (2013.01)

(58) Field of Classification Search
CPC .................................... H04B 3/50; H04B 3/54
USPC ................. 340/12.31–12.34, 13.23
See application file for complete search history.

(56) References Cited

U.S. PATENT DOCUMENTS

| 9,295,032 B2* | 3/2016 | Kumar | H04W 72/02 |
| 9,306,625 B2* | 4/2016 | Lee | H04B 3/56 |
| 2012/0099627 A1* | 4/2012 | Mitchell | H04B 3/546 375/222 |

* cited by examiner

*Primary Examiner* — Carlos E Garcia
(74) *Attorney, Agent, or Firm* — Coats & Bennett, PLLC

(57) ABSTRACT

A method and apparatus is provided for communicating data over a ground power line between a vehicle and a ground terminal. In one example, a first power unit detects a signal indicating connection between the first power unit and a remote power unit. Responsive to detecting the signal, one or more modems associated with the first power unit automatically establish a data connection with one or more remote modems associated with the remote power unit. After establishing the connection between the one or more modems in the first power unit and the one or more modems in the remote power unit, the one or more modems in the first power unit exchange data with the one or more modems in the remote power unit over the power line. In one example, the first power unit may comprise an onboard power unit in a vehicle (e.g., aircraft) and the remote power unit may comprise a ground power unit. Alternatively, the first power unit may comprise a ground power unit and the remote power unit may comprise in a vehicle (e.g., aircraft).

20 Claims, 15 Drawing Sheets

US 10,003,382 B1

COMMUNICATION BETWEEN A VEHICLE AND A GROUND TERMINAL OVER A GROUND POWER LINE

TECHNICAL FIELD

The disclosure relates generally to broadband communications over power lines and, more particularly, to multiple-input, multiple output (MIMO) communications over a ground power line between an airplane or other vehicle and a ground station.

BACKGROUND

Newer airplanes are equipped with wireless communication capability (e.g., WiFi) to facilitate the exchange of large volumes of data between airplanes and airline operation centers during aircraft gate turnaround time. However, wireless connectivity has encountered issues at many airports: limited WiFi infrastructure and bandwidth and interference from passengers' WiFi enabled devices. Additionally, there is a data security risk associated with sharing the common wireless channels.

An alternative to wireless communications is to use wired data communications over airport ground power lines that already exist. However, data transmission over power lines faces two fundamental challenges. First, data transmissions over power lines suffer from large transients, noise and crosstalk on the power lines. Each time an electric load turns on/off, or changes its power consumption levels, it introduces glitches and asymmetries into the power line. Switching power supplies and power inverters create undesirable harmonics. Generators, compressors, motors, relays, fault-circuit interrupters, transistors and rectifiers create noise with their respective signatures. As an example, a commercial airplane parks at an airport terminal gate and receives electrical power from a Ground Power Unit (GPU) hung beneath a jet-way (passenger loading bridge). This GPU provides an average current of 730 amps (A). Due to load variation (adding and shedding), this current may go up to maximum of 1,100 A, drop to 500 A in 10 milliseconds (MS), then decay to a steady state of 260 A in 130 ms. Such disturbances increase the likelihood of signal degradation as seen by a Broadband Power Line (BPL) receiver, and signal attenuation as seen by a BPL transmitter. Performance of BPL communication can also be degraded due mismatch of line impedance and signal reflections by the connectors.

To overcome large transients and noise on power lines, signal strength from a BPL device during its transmitting mode is increased to compensate for degraded signal-to-noise ratio. Increasing the transmission power increases the signal-to-noise ratio and thus reduces error rate. Generally, it is desirable to transmit data end-to-end with an error rate less than 0.001%. Increasing the transmission power sufficient to obtain an acceptable signal-to-noise ratio (i.e., to obtain a desired low error rate), however, produces frequency harmonics, unwanted radiated energy and increased electromagnetic interference with other systems operated at the same frequency range.

A second challenge for communications over ground power lines is radio interference. BPL modems based on the HomePlug audio-video 2 (AV2) standard operate in the 1.8 MHz to 86 MHz band, while BPL modems based on the g.hn standard by the International Telecommunication Union's Telecommunication Standardization sector (ITU-T) operate in the 2 MHz to 100 MHz band. Devices configured according to these two standards operate in the high frequency (HF) and very high frequency (VHF) range occupied by military, aeronautical, amateur radios, and broadcasters. Unlike coaxial line or twisted-pair lines, power lines are unshielded with no inherent noise rejection, thus acting as outdoor antennas for the 2 MHz to 100 MHz signals they carry. Widespread deployment of BPL may have a detrimental effect upon military HF radio communications.

Moreover, interference from nearby systems in close proximity, such as an airport terminal gate area with multiple BPL outdoors installations, further causes signal degradation as the BPL modems may not be able to determine a specific frequency among other signals in the same bandwidth.

When errors in communication become significant, BPL devices become less efficient (packet lost and data retransmission), inoperative or operate in an undesirable manner (data corrupted or contaminated but undetected).

SUMMARY

The present disclosure relates to methods and apparatus for communicating between an aircraft and a terminal when the aircraft is parked at a gate. The connection between the aircraft and the terminal is made over a ground power line while the aircraft is being supplied with power. Data transmissions over the ground power line suffer from large transients, noise and crosstalk on the power lines, which causes signal degradation. Additionally, because the wires of the ground power line are typically unshielded, data transmissions over the ground power line create undesirable radio interference.

The methods and apparatus described herein use MIMO techniques to combat signal degradation and radio interface. More particularly, at the transmitting end, multiple copies of the same signal are offset in phase relative to another and simultaneously transmitted over the ground power line. Each data stream is coupled to a respective wire in the ground power line. At the receiving end, the multiple copies of the signal are extracted from the respective wires of the ground power line and combined to generate a combined signal with improved signal-to-noise ratio. Radio interference is suppressed by transmitting the data streams in a phase offset manner so that the unwanted emissions cancel.

One aspect of the disclosure comprises methods and apparatus for transmitting data between a vehicle and a ground station over a power line having multiple unshielded wires. One or more power line modems generate multiple phase offset data streams from a single data stream and simultaneously transmit the multiple phase offset data streams over the power line to reduce radio interference. The coupling circuit couples the data streams output by the one or more power line modems to respective wires of the power line.

According to one aspect, the power line modems generate and transmit M phase offset data streams with a phase separation of $2\pi/M$ radians. In one example, a single power line modem generates and transmits three phase offset data streams with a phase separation of $2\pi/3$ radians. In another example, each of two power line modems generate and transmit phase offset data streams with a phase separation of $2\pi/4$ or $2\pi/2$ radians.

According to another aspect, the coupling circuit inductively couples each data stream to a respective one of the unshielded wires of the power line with a current transformer. This arrangement provides electrical isolation and reduces electrical hazards.

Another aspect of the disclosure comprises methods and apparatus for receiving data over a power line having multiple unshielded wires. A coupling circuit extracts multiple phase offset data streams, generated from a single data stream and transmitted simultaneously over the power line to reduce radio interference, from respective wires of the power line. One or more power line modems receive the multiple phase offset data streams, and combine the multiple phase offset data streams to regenerate the single data stream.

According to one aspect, the power line modems receive and combine M phase offset data streams with a phase separation of $2\pi/M$ radians. In one example, a single power line modem receives and combines three phase offset data streams with a phase separation of $2\pi/3$ radians. In another example, each of two power line modems receive and combine two phase offset data streams with a phase separation of $2\pi/4$ or $2\pi/2$ radians. In still another example, the coupling circuit extracts each of the phase offset data streams from a respective unshielded wire of the power line with a transformer inductively coupled to the unshielded wire. This arrangement provides electrical isolation and reduces electrical hazards.

According to another aspect of the disclosure, a method is provided for communicating data over a ground power line between a vehicle and a ground terminal. In one example of the method, a first power unit detects a signal indicating connection between the first power unit and a remote power unit. Responsive to detecting the signal, one or more modems associated with the first power unit automatically establish a data connection with one or more remote modems associated with the remote power unit. After establishing the connection between the one or more modems in the first power unit and the one or more modems in the remote power unit, the one or more modems in the first power unit exchange data with the one or more modems in the remote power unit over the power line.

One example of the method further comprises electrically connecting a first subset of wires in the power line before electrically connecting a second subset of wires in the power line. The first power unit detects the signal indicative of the connection on one of the wires in the second subset of wires.

Another example of the method further comprises inductively coupling the one or more modems associated with the first power unit to respective wires in the first subset of wires using transformers.

In one example of the method, the first power unit includes a contactor disposed between the transformers and the remote power unit. The ground power unit enables the contactor responsive to detecting a connection between the first power unit and remote power unit, and disables the contactor responsive to detecting loss of connection between the first power unit and remote power unit.

Another aspect of the method comprises supplying power from a power circuit in the first power unit to the one or more modems.

Another aspect of the method comprises temporarily interrupting, responsive to a predetermined event, the data exchange between the one or more modems in the onboard power unit and the one or more remote modems in the ground power unit while the onboard power unit and the remote power unit are still connected. The predetermined event may, for example, comprise an engine start test.

BRIEF DESCRIPTION OF THE DRAWINGS

In association with the following detailed description, reference is made to the accompanying drawings, where like numerals in different drawings refer to the same element.

DETAILED DESCRIPTION

Aspects of the disclosure relate to methods and apparatus for communicating between an aircraft and a terminal when the aircraft is on the ground. The connection between the aircraft and the terminal is made over a ground power line while the aircraft is being supplied with power. Data transmissions over the ground power line suffer from large transients, noise and crosstalk on the power lines, which causes signal degradation. Additionally, because the wires of the ground power line are typically unshielded, data transmissions over the ground power line create undesirable radio interference.

The methods and apparatus described herein use MIMO techniques to combat signal degradation and radio interface. More particularly, a transmitting device on the aircraft or at the terminal transmits multiple copies of the same signal offset in phase relative to one another over the ground power line. Each data stream is coupled to a respective wire in the ground power line. At the receiving end, the multiple copies of the signal are extracted from the respective wires of the ground power line and combined to generate a combined signal with improved signal-to-noise ratio. Radio interference is suppressed by transmitting the data streams in a phase offset manner so that the unwanted emissions cancel.

While the present disclosure describes methods and apparatus in the context of an airport network, those skilled in the art will appreciate that such methods are more generally applicable to communications between any vehicle (e.g., train, ship, bus, etc.) and a ground station over a power line having multiple wires.

Figure 1:
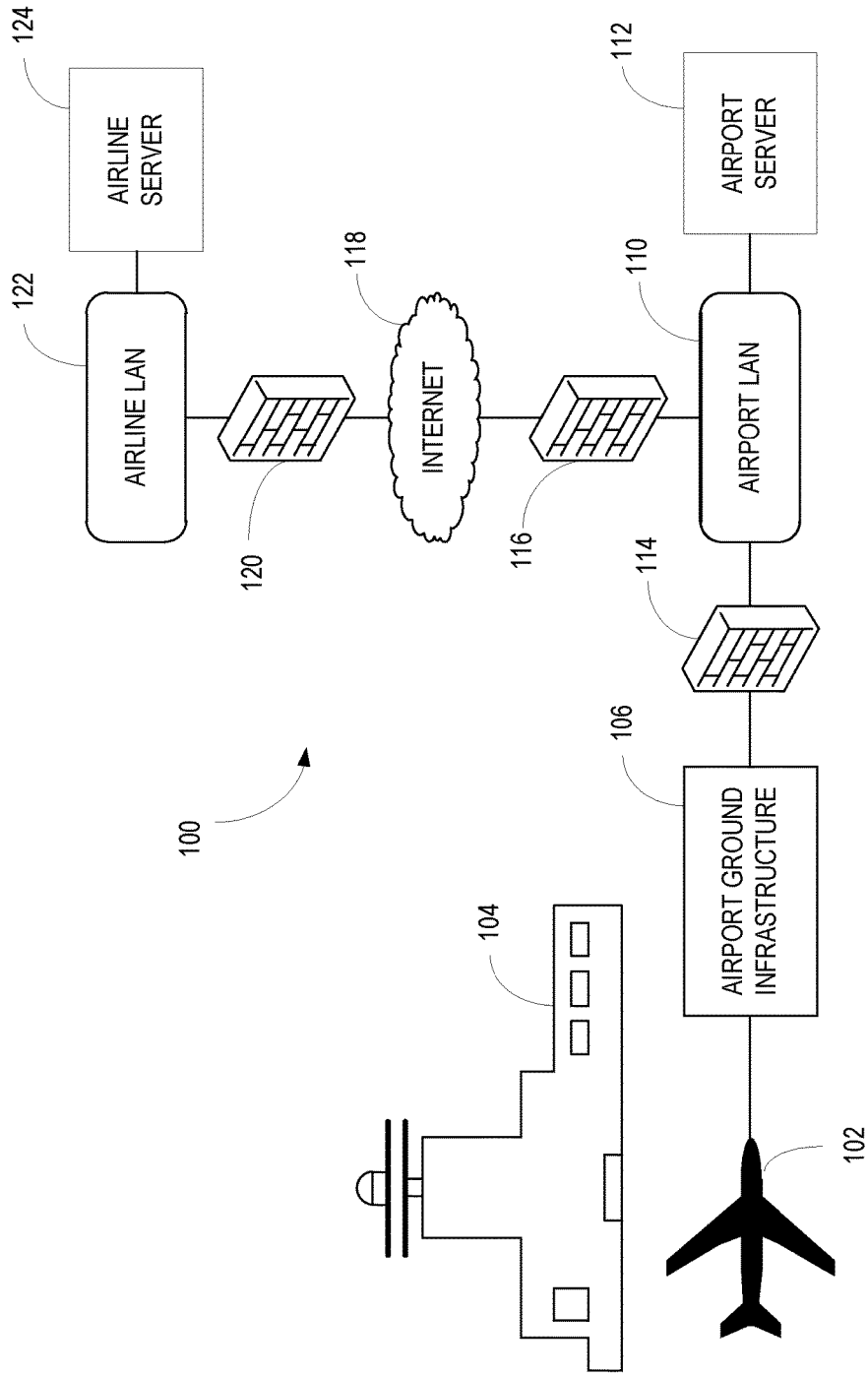
FIG. 1 illustrates an airport communication network for communication between an aircraft on the ground and an airport terminal.

Referring now to the drawings, FIG. 1 illustrates an example airport communication network 100 enabling communication between an aircraft 102 and the terminal 104 when the aircraft is on the ground. The aircraft 102 connects to the airport local area network (LAN) 110 via an airport ground infrastructure 106. The airport ground infrastructure 106 typically includes a GPU 550 (See FIGS. 4-7) for supplying power to the aircraft 102 over a ground power line 520 while the aircraft 102 is on the ground. As described in more detail below, the GPU 550 is modified to include communications equipment for communicating with the aircraft 102. The airport LAN 110 includes an airport server 112 that communicates with the aircraft 102. The airport LAN 110, in turn may connect via the Internet 118 or other wide area network (WAN) to an airline LAN 122. The airline LAN 122 includes an airline server 124 that communicates with the aircraft 102. Firewalls 114 and 116 prevent unauthorized access to the airport LAN 110 and aircraft 102, while firewall 120 prevents unauthorized access to the airline LAN 122.

Figure 2:
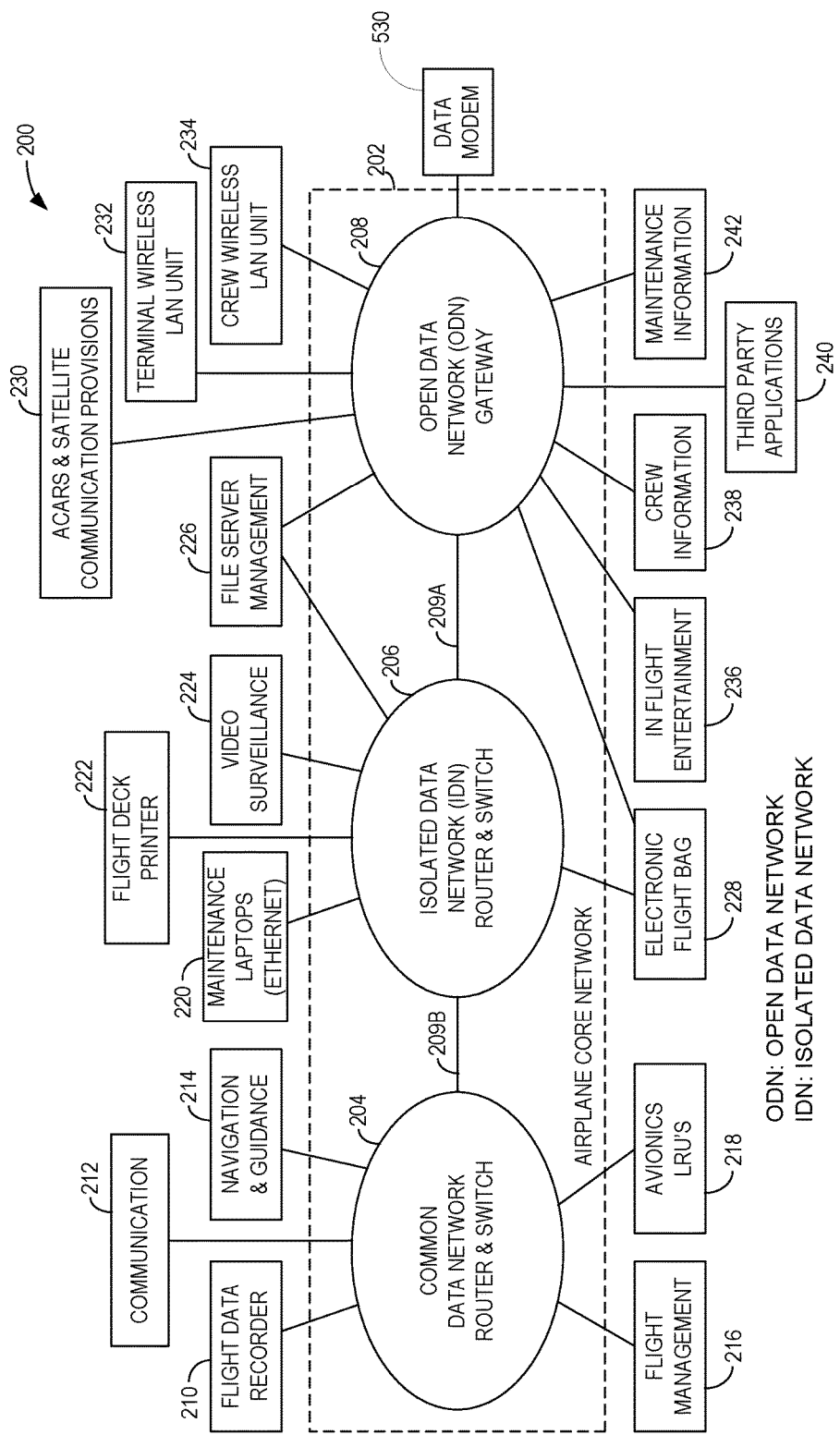
FIG. 2 illustrates an aircraft communication network onboard an aircraft.

FIG. 2 illustrates an exemplary aircraft network 200 on board an aircraft 102. An aircraft core network 202 can include a common data network 204, an isolated data network (IDN) 206 and an open data network (ODN) 208. The ODN 208 can connect with the IDN 206 via a bus 209A and the IDN 206 can connect with the common data network 204 via a bus 209B. The common data network 204 and the IDN 206 can connect devices via routers and switches, and the ODN 208 can connect devices via gateways, for example. The switches connect multiple devices via LAN's using media access control (MAC) addresses, routers are a secure way to connect devices via LAN and WAN with Internet protocol (IP) addresses, and the gateways can include a processor and memory for connecting and translating data between devices using different architectures, protocols and waveforms.

Figure 3:
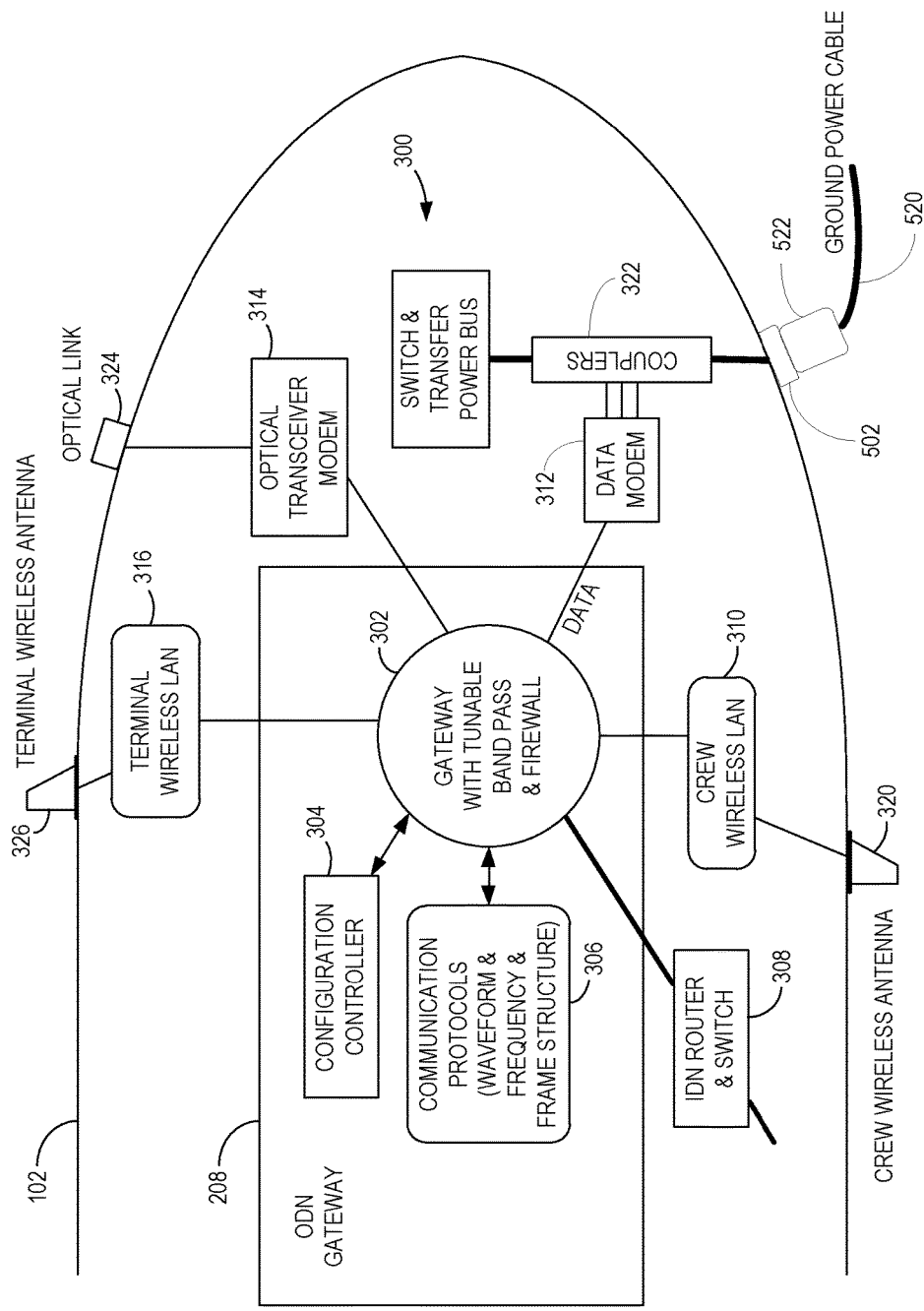
FIG. 3 illustrates a gateway and other aspects of the aircraft communication network.

FIG. 3 is a block diagram of an example communication structure 300 for the aircraft 102. The ODN 208 includes a gateway 302 with tunable band pass and firewall, a configuration controller 304 and communication protocols 306, e.g., for determining waveform, frequency and frame structure. Based on connectivity performance and service fees available at a given airport, an airline can preselect one of the links among wireless, e.g., Wi-Fi, cellular, airport service network, optical, etc., and wired links for exchanging data between the aircraft 102 and airline server 124. Configuration controller 304 may configure proper waveforms, frequencies and frame structures associated with the particular communication link that the airline has chosen for the airport terminal 104. If link performance degrades or data transfer deteriorates, e.g., due to various reasons including interference, environment conditions, etc., configuration controller 304 switches to another link available at the airport terminal 104. The configuration controller 304 can also reconfigure waveforms, frequencies and frame structures associated with that link. Configuration controller 304 can also adjust band pass filters of the gateway 302 to accommodate communication bandwidth and waveforms for that chosen link.

The gateway 302 connects with the IDN router and switch 308, e.g., which provides the IDN 206 of FIG. 2. The gateway 302 can perform as a central gateway in the communication structure 300. The gateway 302 can also connect with a crew wireless LAN 310, an Ethernet or a power line communication (PLC) modem 312, an optical transceiver modem 314 and a terminal wireless LAN 316. To connect the aircraft 102 with the airport terminal 104, the aircraft 102 can include a crew wireless network antenna 320 for sending signals to/from the crew wireless LAN 310, a power line coupling circuit 322 for connecting the modem 312 to the power receptacle as herein after described, an optical link connector 324 for connecting signals with the optical transceiver modem 314, and a wireless link antenna 326 for connecting signals with the terminal wireless LAN 316.

Referring back to FIG. 2, the devices of the aircraft 102 that connect with the common data network 204 can include a flight data recorder 210, communication devices 212, navigation and guidance devices 214, flight management equipment 216 and avionics line replaceable units (LRU) 218. Devices that connect with the IDN 206 can include maintenance laptops 220, e.g., via the Ethernet, flight deck printers 222, video surveillance equipment 224, file server management devices 226 and electronic flight bags 228. The file server management devices 226 and electronic flight bags 228 can also connect with the ODN 208, e.g., to send and receive information via the ODN 208. Other devices that connect with the ODN 208 can include satellite communication provisions 230, terminal wireless LAN units 232, crew wireless LAN units 234, in-flight entertainment equipment 236, crew information servers 238, third party applications 240, and maintenance information servers 242.

Figure 4:
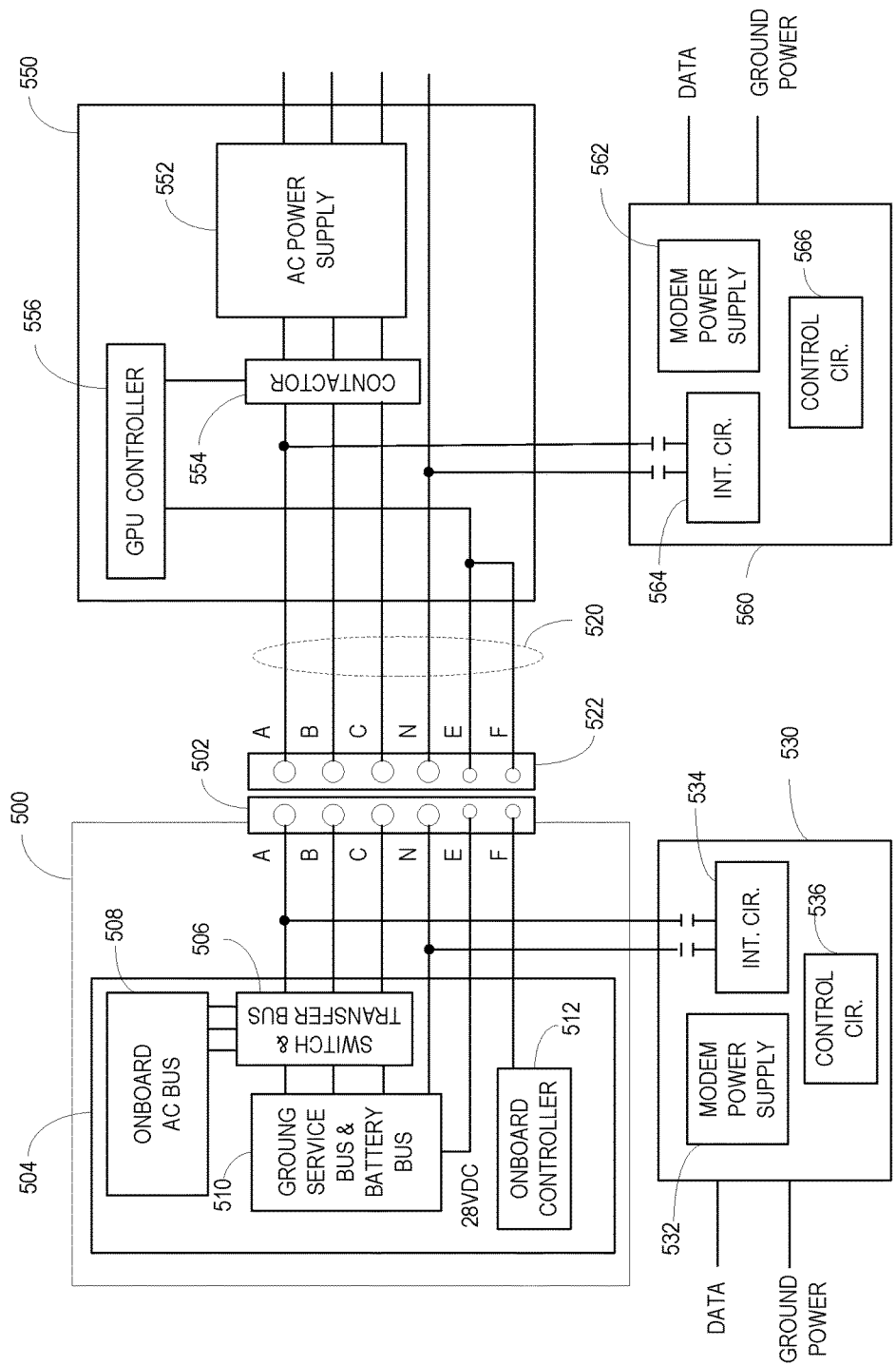
FIG. 4 illustrates a modem in an aircraft for communicating with a modem in a ground power unit over a ground power line using conventional single-stream single-input, single-output (SISO) modems and capacitive coupling.
Figure 5:
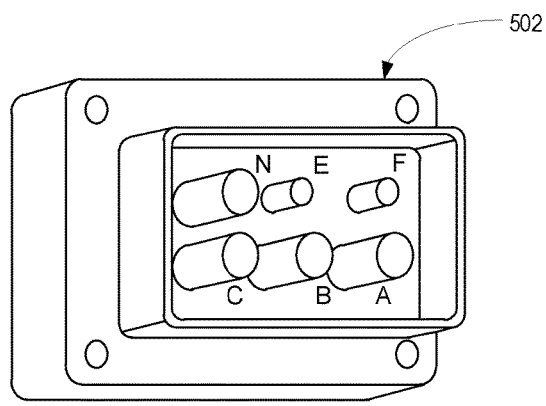
FIG. 5 illustrates a receptacle on aircraft for connecting to a ground power cable.

FIG. 4 illustrates one arrangement for communicating, using a single data stream, between an aircraft 102 and a terminal 104 while the aircraft 102 is on the ground. In this arrangement, an onboard power unit 500 on board the aircraft couples to a GPU 550 over a ground power line 520. BPL modems 530, 560 are capacitively coupled to the ground power line 520 at the aircraft side and terminal side. The details of the onboard power unit 500 and GPU 550 are not material to the communication method, but are summarized below to provide context for the communication techniques herein described.

The onboard power unit 500 includes a receptacle 502 or other connector for connecting the ground power line 520 to the aircraft 102, and an aircraft power supply 504 that receives power from the GPU 550 over the ground power line 520 and distributes the power to various loads on the aircraft 102. Receptacle 502 engages with a plug 522 or other connector (described below) attached to the end of the power line 520). Receptacle 502 is configured such the phase wires A, B, and C and neutral wire N of the power line 520 are electrically connected before the control wires E and F. In one example, receptacle 502, shown in FIG. 5, includes four long pins (i.e., A, B, C, and N) and two short pins (E and F). When the connector 522 is engaged with the receptacle 502, the long pins make electrical contact before the short pins.

The aircraft power supply 504 comprises a switch and transfer bus 506 that receives three phase power over wires A, B, and C, an onboard alternating current (AC) bus 508 that distributes the AC power to various loads on the aircraft 102, a ground service and battery bus 510 that provides 28 volts of direct current (28 VDC) to pin E on the receptacle, and an onboard controller 512. The onboard controller 512 monitors the quality of the three phase AC power and voltage on pin F to detect connection of the ground power line.

Figure 6:
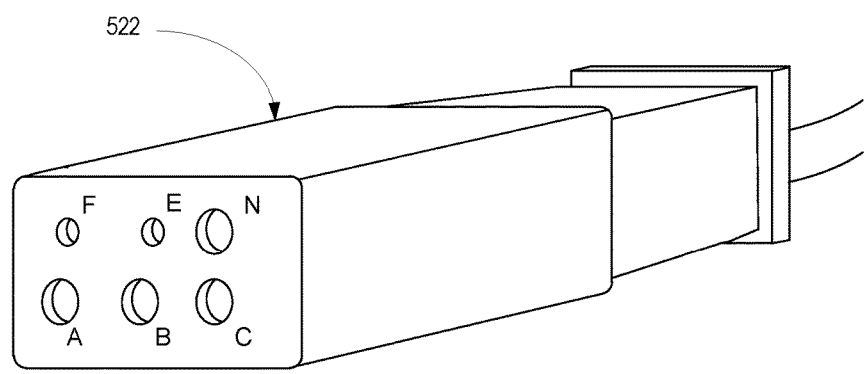
FIG. 6 illustrates a connector plug on one end of a ground power cable for connecting to a receptacle of an aircraft.

The GPU 550 comprises an AC power supply 552, contactor 554, a GPU controller 556, and power line 520. The AC power supply 552 comprises the components (e.g., inverters, filters, transformers, breakers, etc.) necessary to provide clean, three phase AC power to the aircraft 102. Contactor 554 couples the AC power supply 552 to the ground power line 520, which includes a female plug 522 or other connector configured to mate with the receptacle 502 connected to the onboard power unit 500. The female plug 522 is shown in FIG. 6. The GPU controller 556 detects a signal (28 VDC in this case) on pins E and F when the ground power line 520 is connected to the receptacle 502 of the aircraft 102 and enables/disables the contactor 554 depending on the presence of the signal. When plug 522 is pulled away from the receptacle 502, the short pins of the receptacle 502 break before the long pins resulting in a loss of 28V on pins E and F and the GPU controller 556 disables the contactor 554 to disconnect the AC power and prevent arcing when the ground crew disconnects the ground power line 520.

To communicate over the ground power line 520, a first BPL modem 530 capacitively couples to the ground power line 520 at the onboard power unit 500 and a second BPL modem 560 capacitively couples to the ground power line 520 at the GPU 550. BPL modems 530, 560 each include a power supply, 532, 562, an interface circuit 534, 564 for communicating over the ground power line 520, and a control circuit 536, 566 that controls the operation of the modems 530, 560. The power supplies 532, 562 are connected to ground power. In one example, the BPL modems 530, 560 are configured to operate according to the HomePlug AV2 and/or the ITU-T G.hn standards, although other communication standards could be used. HomePlug AV2 uses frequencies in the range 1.8 MHz-86 MHz. The ITU-T G.hn standard (over power line, phone line and coax) uses a 2 MHz-50 MHz band for MIMO, and 2 MHz-100 MHz band for SISO.

To form a Kirchhoff loop, two outputs of modem 530 are connected to phase (A, B, or C) and neutral (N) wires respectively. In this arrangement, a crew member manually connects the power and data of the two modems on the ground. Capacitor failure could lead to an electric shock—a safety hazard to operators especially on wet ground. This arrangement enables transmission of a single data stream at a given time.

Figure 7:
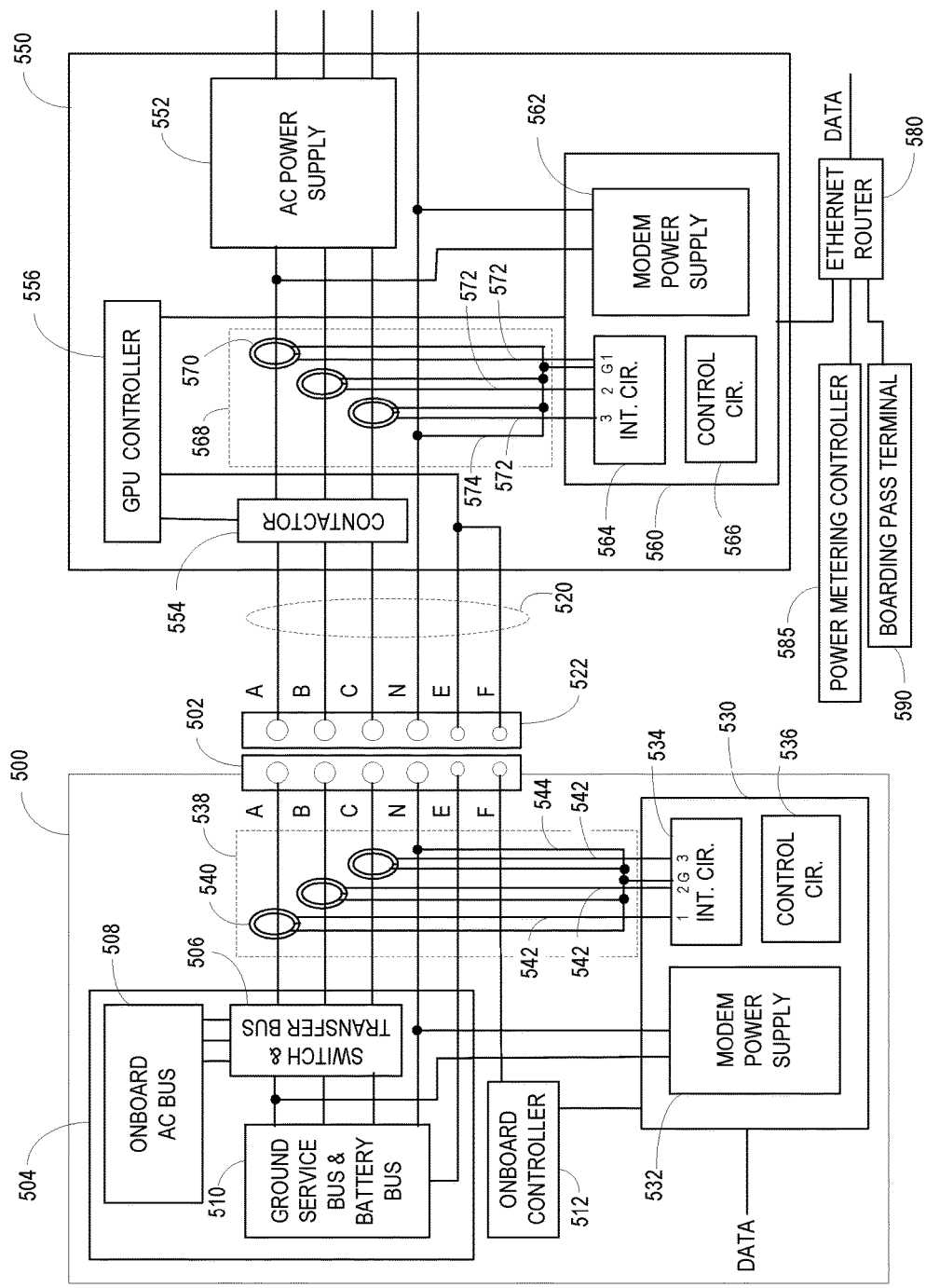
FIG. 7 illustrates a 3×3 MIMO modem in an aircraft communicating with a 3×3 MIMO modem in a ground power unit over a ground power line.
Figure 8:
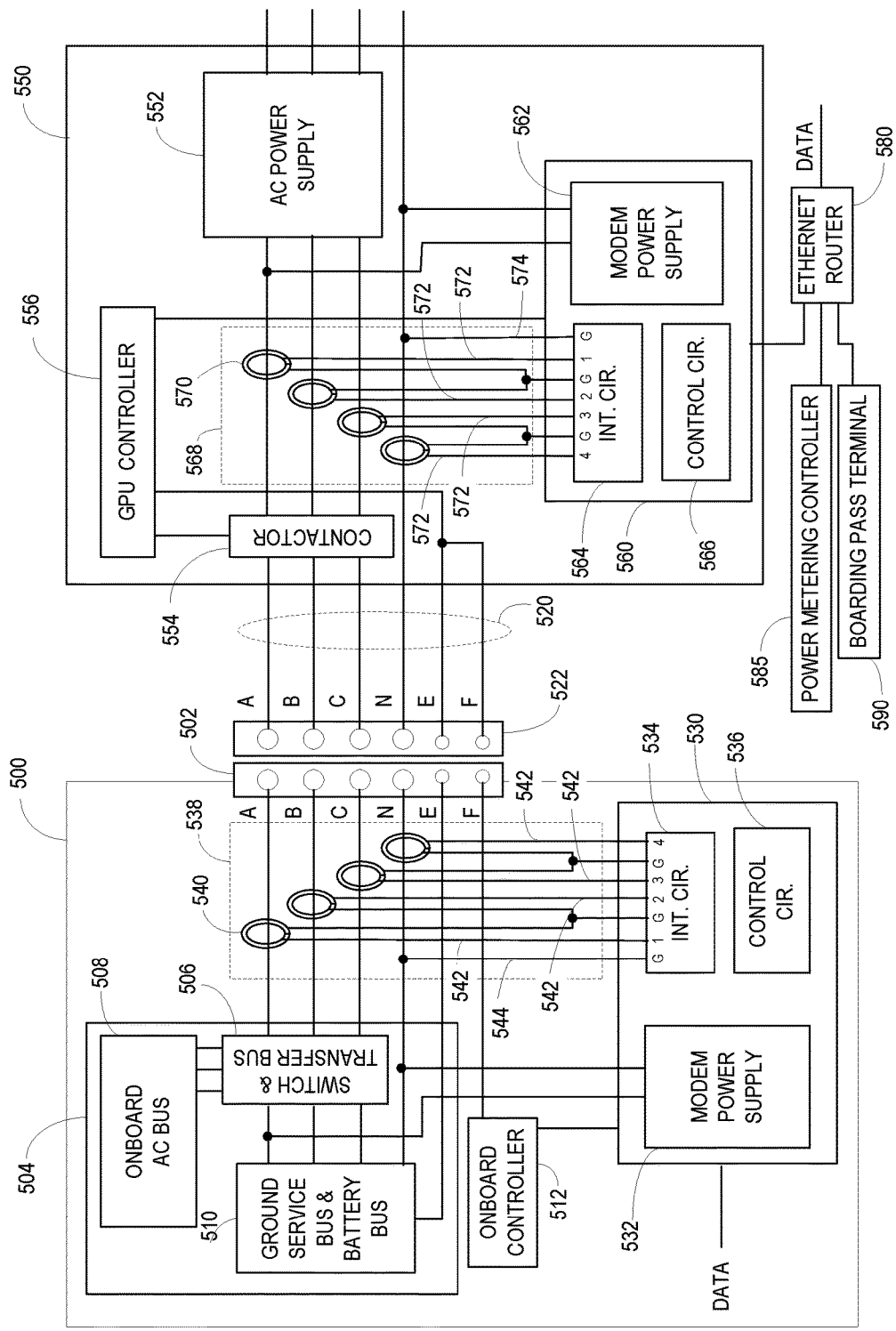
FIG. 8 illustrates a 4×4 MIMO modem in an aircraft communicating with a 4×4 MIMO modem in a ground power unit over a ground power line.
Figure 9:
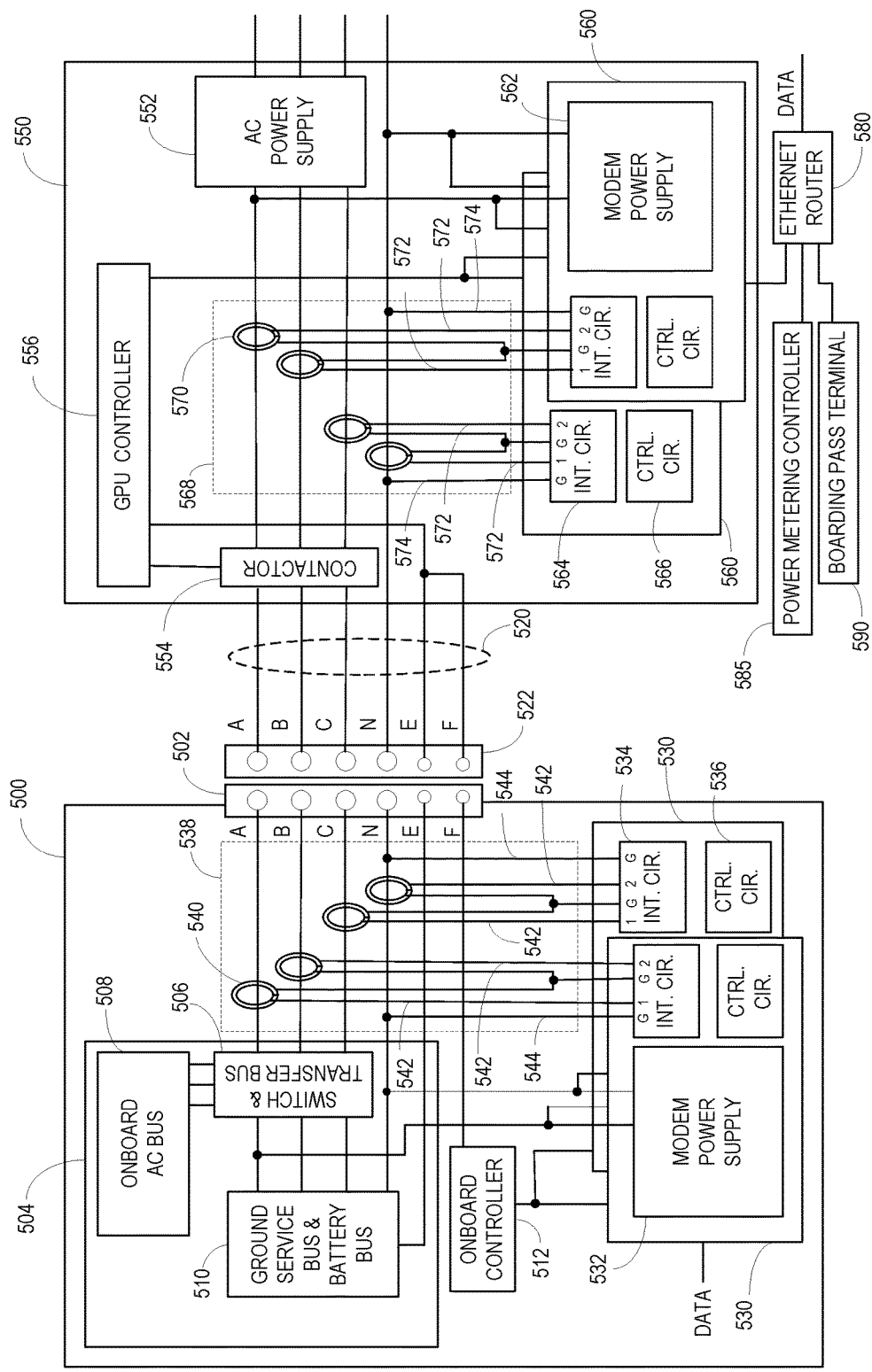
FIG. 9 illustrates two 2×2 MIMO modems in an aircraft communicating with two 2×2 MIMO modems in a ground power unit over a ground power line.

FIGS. 7-9 show alternate arrangements for communicating between an aircraft 102 and the terminal 104 over a ground power line 520 when the aircraft 102 is on the ground. The ground power line 520 in FIGS. 7-9 includes a plug 522 or other connector 522 that mates with a receptacle 502 on the aircraft 102 as previously described. The arrangements in FIGS. 7-9 use many of the same elements as the arrangement shown in FIG. 4. Therefore, for the sake of brevity, the reference numbers in FIG. 4 are also used in FIGS. 7-9 to indicate similar components and the description of those elements is omitted except where necessary to highlight any differences.

Referring to FIG. 7, BPL modems 530, 560 are integrated into the onboard power unit 500 and GPU 550 respectively. Similar to the example shown in FIG. 4, data is transmitted between BPL modem 530 and the BPL modem 560 over the ground power line 520 that connects the onboard power unit 500 to the GPU 550. In contrast to the arrangement shown in FIG. 4, the aircraft power supply 504 provides power to the BPL modem 530 and the AC power supply 552 in the GPU 550 provides power to BPL modem 560. Also, onboard controller 512 in the aircraft power supply 504 is configured to command the BPL modem 530. Also, BPL modem 560 is connected by a switch or Ethernet router 580 to a power metering controller 585 to monitor power usage and a boarding pass terminal 590 at the boarding gate in the terminal 104.

BPL modem 530 includes a power supply 532, interface circuit 534 and control circuit 536. As noted above, the power supply 532 receives power from the aircraft power supply 504 and supplies the BPL modem 530 with power. The interface circuit 534 performs baseband processing of data signals transmitted and received by the BPL modem 530. The baseband processing includes, inter alia, modulation/demodulation, coding/decoding, and other digital signal processing tasks necessary to transmit and receive data signals. The transport format, i.e., modulation and coding scheme (MCS), for transmitting and receiving data signal is not material to the invention. In one example, Orthogonal Frequency Division Multiplexing (OFDM) in accordance with the Institute of Electrical and Electronics Engineers (IEEE) 802.11 family of standards is used for broadband communications. Control circuit 536 controls the operation of the BPL modem 530. The control functions performed by the control circuit 536 include turning the power to the BPL modem 530 on and off responsive to signals from the onboard controller 512, and controlling the interface circuit 534 to apply the desired phase offset when transmitting and receiving data.

According to one aspect of the disclosure, the interface circuit 534 is configured to simultaneously transmit and receive multiple data streams using MIMO techniques. In this example, the interface circuit 534 is configured to simultaneously transmit and receive three data streams offset in phase by $2\pi/3$ radians or 120 degrees. More generally, the phase offset is equal to $2\pi/M$, where M equals the number of data streams transmitted or received by the BPL modem 530.

Figure 14:
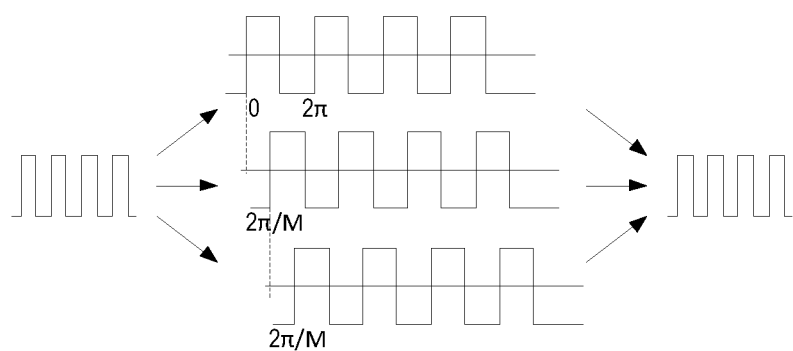
FIG. 14 illustrates the phase offset between signals transmitted in accordance with the present disclosure.

FIG. 14 illustrates the phase offset. This phase offset or phase separation can be achieved on the transmitter side by shifting the phase of two data streams relative to a first data stream, or by shifting the phase of all three data streams to achieve a desired phase rotation. The phase offset causes the unwanted emissions of the individual wires to cancel so that radio interference is reduced.

A coupling circuit 538 couples respective data input/output (I/O) ports of the BPL modem 530 to respective wires of the ground power line 520. The coupling circuit 538 comprises three data lines 542 and a return line 544. The data lines 542 (labeled 1, 2, and 3) connect the I/O ports of the BPL modem 530 to respective phase wires A, B, and C of the ground power line 520, though use of the phase wires for data transmissions is not required. Return line 544 connects a ground port G of the BPL modem 530 to the neutral wire N of the ground power line 520 and provides a common return for the data line 542. The current transformers 540 provide electrical isolation from the ground power line 520 so that electrical hazard is reduced and crew safety is improved. When the BPL modem 530 is transmitting, the current transformers 540 superimpose the data signals output by the modem 530 onto the load currents of the phase wires A, B, and C, which in this example are offset in phase by $2\pi/3$ radians or 120 degrees to reduce radio interference. When receiving a data transmission, the current transformers 540 extract the individual data streams from the ground power line 520, which are combined by the interface circuit 534 to generate a combined signal with improved signal quality, e.g. improved signal-to-noise ratio.

In the example shown in FIG. 7, the contactor 554 is disposed between the coupling circuit 568 and the plug 522. This aspect allows the ground crew to perform the same routine without additional workload or labor to connect the BPL modems 530, 560. That is, the ground crew does not need to connect or disconnect any data lines or additional power lines in order to connect or disconnect the BPL modems 530, 560.

When the ground power line 520 is connected to the aircraft 102, the onboard controller 512 in the aircraft power supply detects the presence of 28V DC on pin F and generates a control signal that enables the BPL modem 530. Responsive to the control signal from the onboard controller 512, the control circuit 536 turns the power to the BPL modem 530 on and establishes a connection with the BPL modem 560 at the terminal. Once the connection with BPL modem 560 is established, data transmission and reception can begin.

The BPL modem 530 communicates over the ground power line 520 with a BPL modem 560 on the terminal side. BPL modem 560 includes a power supply 562, interface circuit 564 and control circuit 566. The AC power supply 552 in the GPU 550 provides power to the BPL modem 560. The interface circuit 564 performs baseband processing of data signals transmitted and received by the BPL modem 560. The baseband processing includes, inter alia, modulation/demodulation, coding/decoding, and other digital signal processing tasks necessary to transmit and receive data signals. The transport format, i.e. modulation and coding scheme (MCS), for transmitting and receiving data signal is not material to the invention. In one example, Orthogonal Frequency Division Multiplexing (OFDM) in accordance with the IEEE 802.11 family of standards is used for broadband communications. Control circuit 566 controls the operation of the BPL modem 560. The control functions performed by the control circuit 566 include turning the power to the BPL modem 560 on and off responsive to signals from the GPU controller 556, and controlling the interface circuit 564 to apply the desired phase offset when transmitting and receiving data.

According to one aspect of the disclosure, the interface circuit 564 is configured to simultaneously transmit and receive multiple data streams using MIMO techniques. In this example, the interface circuit 564 is configured to simultaneously transmit and receive three data streams offset in phase by $2\pi/3$ radians or 120 degrees. More generally, the phase offset is equal to $2\pi/M$, where M equals the number of data streams transmitted or received by the modem 560. This phase offset or phase separation can be achieved on the transmitter side by shifting the phase of two data streams relative to a first data stream, or by shifting the phase of all three data streams to achieve a desired phase rotation.

A coupling circuit 568 couples respective data input/output (I/O) ports of the BPL modem 560 to respective wires of the ground power line 520. The coupling circuit 568 comprises three data lines 572 and a return line 574. The data lines 572 connect the I/O ports of the BPL modem 560 to respective phase wires A, B, and C of the ground power line 520, though use of the phase wires for data transmissions is not required. Return line 574 connects a ground port of the BPL modem 560 to the neutral wire N of the ground power line 520 and provides a common return for the data line 572. The current transformers 570 provide electrical isolation from the ground power line 520 so that electrical hazard is reduced and crew safety is improved. In the exemplary embodiment, contactor 554 is disposed between the coupling circuit 568 and the connector 522. When the BPL modem 560 is transmitting, the current transformers 570 superimpose the data signals output by the modem 560 onto the load currents of the phase wires A, B, and C, which in this example are offset in phase by $2\pi/3$ radians or 120 degrees to reduce radio interference. When receiving a data transmission, the current transformers 570 extract the individual data streams from the ground power line 520, which are combined by the interface circuit 564 to generate a combined signal with improved signal quality, e.g. improved signal-to-noise ratio.

When the ground power line 520 is connected to the aircraft 102, the GPU controller 556 in the GPU 550 detects the presence of 28V DC on pins E and F and generates a control signal that enables the BPL modem 560. Responsive to the control signal from the GPU controller 556, the control circuit 566 turns the power to the BPL modem 560 on and establishes a connection with the BPL modem 530 on the aircraft 102. Once the connection with BPL modem 530 is established, data transmission and reception can begin.

FIG. 8 illustrates an alternative arrangement for communications between an aircraft 102 and the terminal 104 over a ground power line 520 when the aircraft 102 is on the ground. The arrangement shown in FIG. 8 is essentially the same as the arrangement shown in FIG. 7, except that the BPL modems 530 and 560 are configured for 4×4 MIMO. In this arrangement, BPL modems 530 and 560 include at least 4 I/O ports connected by respective data lines 542, 572 to respective wires of the ground power line 520. Three I/O ports are connected by respective data lines 542, 572 to the phase wires A, B, C of the ground power line 520. The fourth I/O port is connected by a respective data line 542, 572 to the neutral wire N of the ground power line 520. The interface circuits 534, 564 are configured to simultaneously transmit and receive four data streams offset in phase by $2\pi/4$ radians or 90 degrees. This phase offset or phase separation can be achieved on the transmitter side as previously described by shifting the phase of three data streams relative to a first data stream, or by shifting the phase of all four data streams to achieve a desired phase rotation.

FIG. 9 illustrates an alternative arrangement for communications between an aircraft 102 and the terminal 104 using two BPL modems 530 and 560 on the aircraft and two BPL modems at the terminal 104. In this arrangement, BPL modems 530 and 560 include 2 I/O ports connected by respective data lines 542, 572 to respective phase wires of the ground power line 520. The interface circuits 534, 564 in each BPL modem 530, 560 are configured to simultaneously transmit and receive two data streams. In one example, each BPL modem generates two data streams offset in phase by $2\pi/4$ radians or 90 degrees. In this example, a first BPL modem 530, 560 at each end applies a phase offset of 0 and $\pi/2$ to respective signals and the second BPL modem 530, 560 at each end applies a phase offset of $\pi$ and $3\pi/2$. In another example, each BPL modem generates two data streams offset in phase by $\pi$ radians or 180 degrees. In this example, a first BPL modem 530, 560 at each end applies a phase offset of 0 and $\pi$ to respective signals and the second BPL modem 530, 560 at each end applies a phase offset of $\pi/2$ and $3\pi/2$ to two signals. The result in either case is four data streams with a phase offset or phase separation of $2\pi/4$. At the transmitter side, a multiplexer (not shown) splits the original data stream into two streams and each BPL modem 530 performs 2×2 MIMO on the input data stream. At the receiver side, each BPL modem performs 2×2 MIMO to generate an output data stream. A demultiplexer (not shown) receives and combines the output data stream from each BPL modem 560.

Figure 10A:
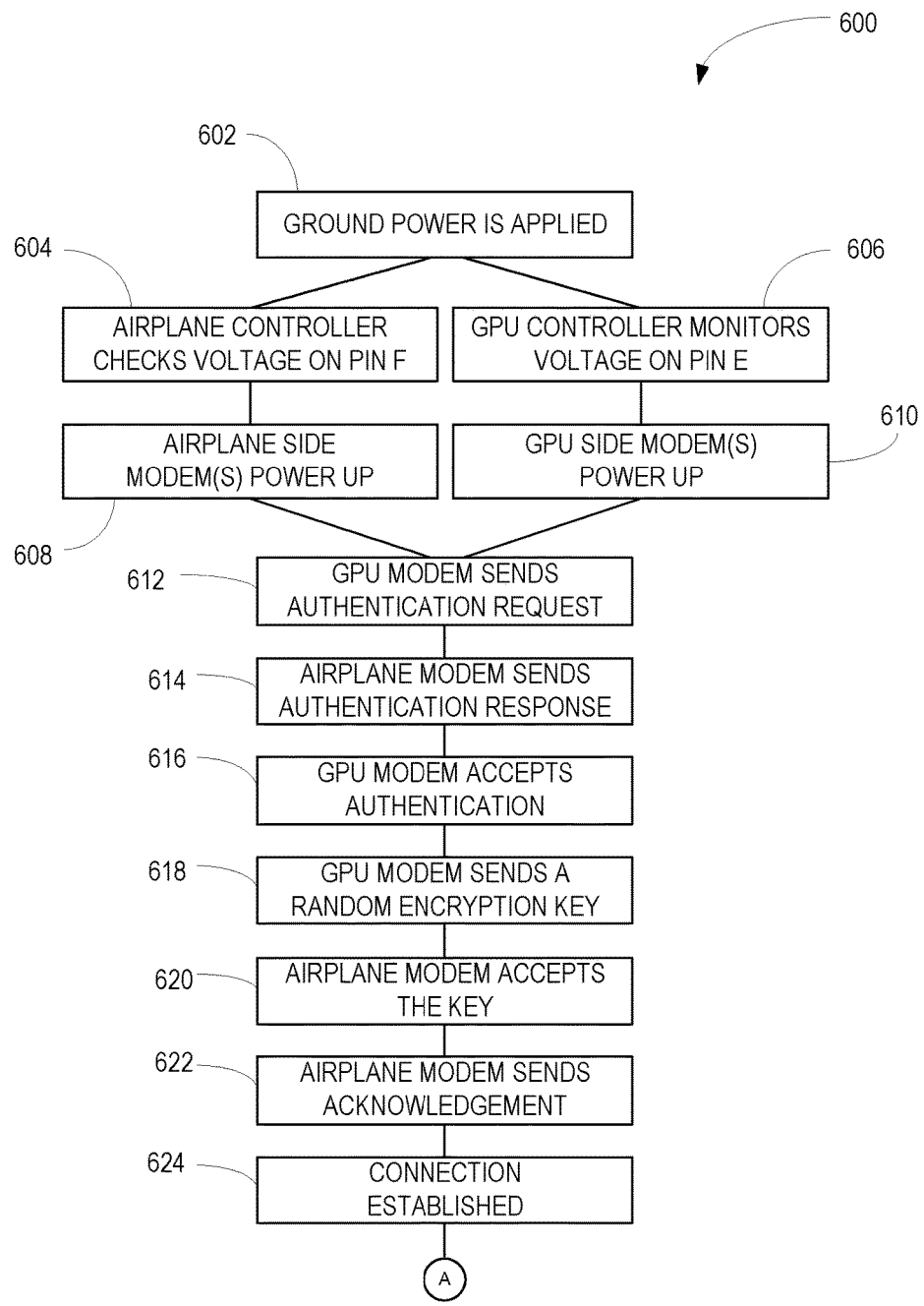
FIGS. 10A and 10B illustrate exemplary control logic to control the MIMO modems.
Figure 10B:
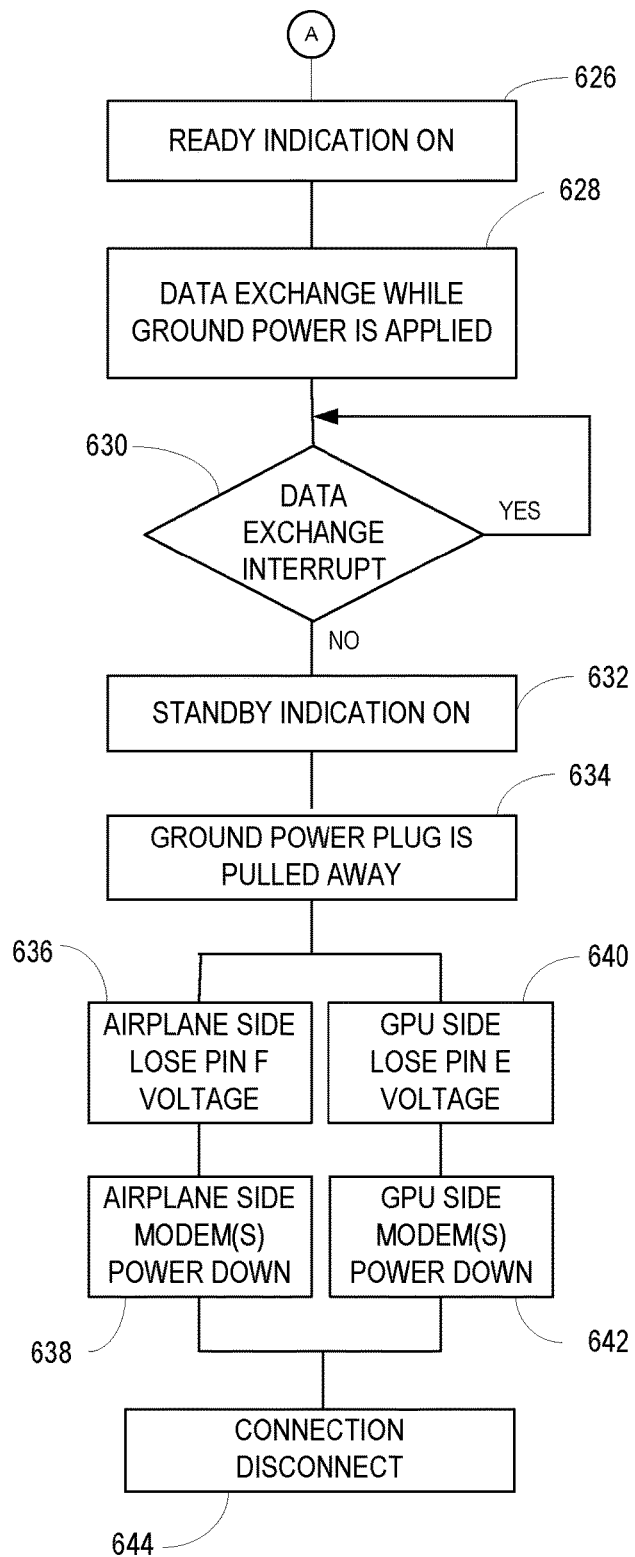

FIGS. 10A and 10B illustrate a procedure 600 for data communications over a ground power line 520 as herein described. When the ground power line is applied, i.e., the ground power line is connected (block 602), the onboard controller 512 for the aircraft 102 detects the voltage on pin F, and turns on the power to the BPL modem 530 (blocks 604, 608). On the terminal side, the GPU controller 556 detects the voltage on pin E and enables the BPL modem 560 (blocks 606, 610). BPL modems 530 and 560 then perform an authentication procedure. In one example, the BPL modem 560, during its power up routine, sends an authentication request to the BPL modem 530 in the aircraft 102 (block 612). Within a predetermined time, the BPL modem 530 in the aircraft 102 sends back an authentication response (block 614). The BPL modem 560 at the terminal verifies the authentication response and sends a randomly generated encryption key to the BPL modem 530 on the aircraft 102 (blocks 616, 618). The BPL modem 530 on the aircraft 102 accepts the key and sends back an acknowledgement (ACK) (blocks 620, 622). This process allows the BPL modems 530, 560 having the same key to communicate. After the BPL modem 530 sends the ACK, the connection is established and the ready indication is turned on (blocks 624, 626). At this point, the BPL modems 530 and 560 are ready to transmit and receive data over the ground power line 520 (block 628). If, during the data exchange, it is desired to perform an engine start test on the ground or other procedure likely to disrupt communications, the data flow may be held by an interrupt command (block 630). In one example, the interrupt command is issued by the onboard controller 512 to the modem 530 in the onboard power unit 500. Data exchange may resume after inrush current subsides. A standby turns on after data exchange is completed, within a typical gate turnaround time (block 632). The BPL modems 530 and 560 store the security settings if ground power is lost. Before airplane push back, the ground power plug must be pulled away from the airplane receptacle 502 (block 634). When the ground power plug is pulled, the onboard controller 512 for the aircraft 102 detects the loss of voltage on pin F, and turns off the power to the BPL modem 530 (636, 638). On the terminal side, the GPU controller 556 detects the loss of voltage on pins E, cuts off the power to the airplane and at the same time disables the BPL modem 660 (blocks 640, 642). At this point, the connection between BPL modems 530 and 560 is terminated (block 644). This procedure allows the ground crew to conduct the same routine operation of connecting and disconnecting the ground power line 520, without the extra procedures for connecting and disconnecting the BPL modems 530, 560.

Figure 11:
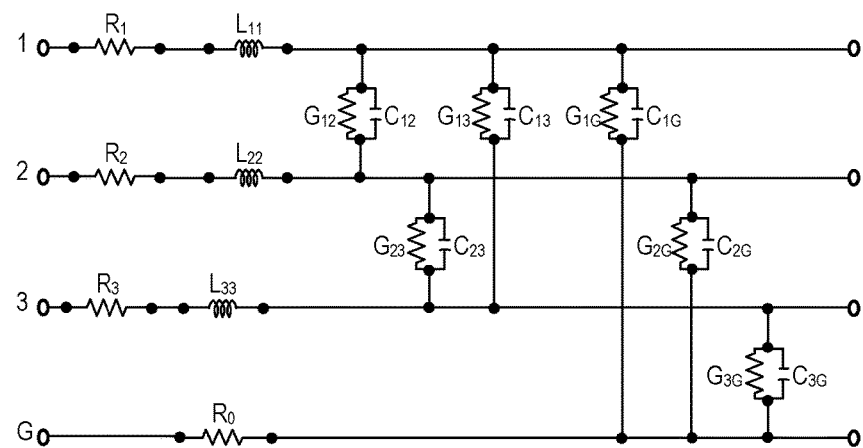
FIG. 11 illustrates a model of the impedance of the ground power line.
Figure 12:
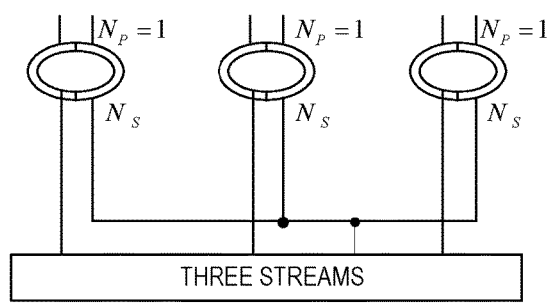
FIG. 12 illustrates the impedance matching of the current transformers to the modems and ground power lines.

According to one aspect of the disclosure, the current transformers 540, 570 are impedance matched to the ground power line 520 and BPL modems 530, 560. FIG. 11 illustrates a model of the impedance of the ground power line. Impedance matching is achieved by adjusting the number of turns in the primary and secondary windings of the current transformers 540, 570 as shown in FIG. 12. To obtain an impedance match within the frequency band that modems operate, the number of turns on the primary and secondary windings of the current transformers 540, 570 are adjusted according to:

$$Z_p/Z_s = (N_p/N_s)^2 \quad \text{(Eq. 1)}$$

where $Z_p$ is the impedance of the ground power line 520, $Z_s$ is the impedance of the modem input/output port, $N_p$ is the number of turns on the primary winding, and $N_s$ is the number of turns on the secondary winding. In one example, the primary winding has a single turn to provide current isolation and the number of turns for the secondary winding is selected to provide the best possible impedance match.

As noted above, the exemplary arrangements employ MIMO techniques to simultaneously transmit and receive multiple copies of the same data stream. Conventional BPL modems use single-input, single-output (SISO) techniques that involve transmitting and receiving one data stream at a time. For communication over power lines, the capacitance between separate power wires causes the signals on one line to couple onto the neighboring ones. The coupling process between phase lines introduces a phase shift. Therefore, after propagating along the lines, the components of a communications signal on each line will arrive no longer in phase with each other, and/or with different amplitudes. Such coupling and crosstalk cause problems with receiving equipment, which must attempt to decode the received signal and reconstruct the original data.

MIMO is an improved wireless communication technique that enables simultaneous transmission and reception of multiple signals over the same wireless channel by exploiting the spatial properties of the channel. MIMO increases channel capacity, i.e., provides bandwidth at higher signal-to-noise ratios. One aspect of the present disclosure is the recognition that the ground power line 520 can be modeled as a multipath channel, where each wire in the ground power line 520 corresponds to one propagation path. The MIMO channel can be characterized and exploited by the BPL modem 530, 560 at the receiving end to detect the signal carried on each wire.

Figure 13:
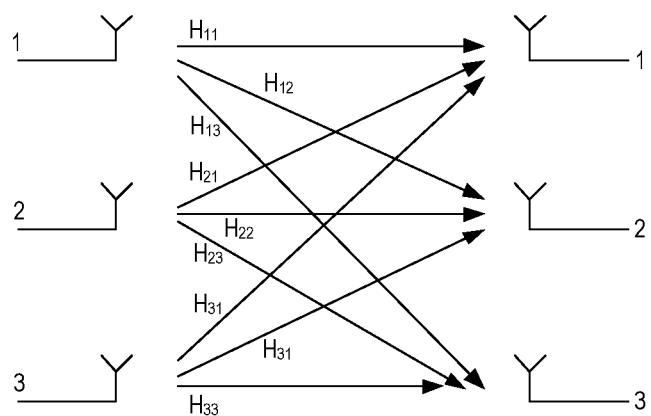
FIG. 13 illustrates a channel matrix representing the ground power line.

FIG. 13 illustrates a channel matrix that represents the physical environment of an unshielded ground power line 520 that carries three data streams. Each element $H_{x,y}$ of the channel matrix H is a channel coefficient that models the distortion of the channel between the transmitter and the receiver. The channel coefficients where x=y model the distortion caused by respective wires. The channel coefficients where x≠y model the crosstalk between wires.

The receiving BPL modem 530, 560 uses the channel matrix H of a given ground power line 520 to remove the undesirable reflections, distortions and crosstalk to restore the original data streams. While MIMO is conventionally used to transmit and receive two or more different data streams, the communication systems described herein use MIMO to transmit multiple copies of the same signal, which can be combined by the receiving BPL modem 530, 560 to mitigate the signal degradation. The phase offset applied by the transmitter is taken into account by the channel matrix H. Combining multiple copies of the same signal also allows the BPL modem at the transmitting end to reduce its transmit power, which also reduces radio interference. The phase offset causes any unwanted emissions from each individual wire to cancel thereby reducing radio interference.

In scenarios where only low data rates are needed, the input data stream at the transmitter side may be split into multiple streams and transmitted. In one example, the multiple data streams are partially redundant, i.e., overlapping. In another example, the multiple data streams are wholly non-redundant, i.e., non-overlapping. Each stream will suffer from greater signal degradation, which means that more retransmissions will be required resulting in a lower data rate.

Figure 15:
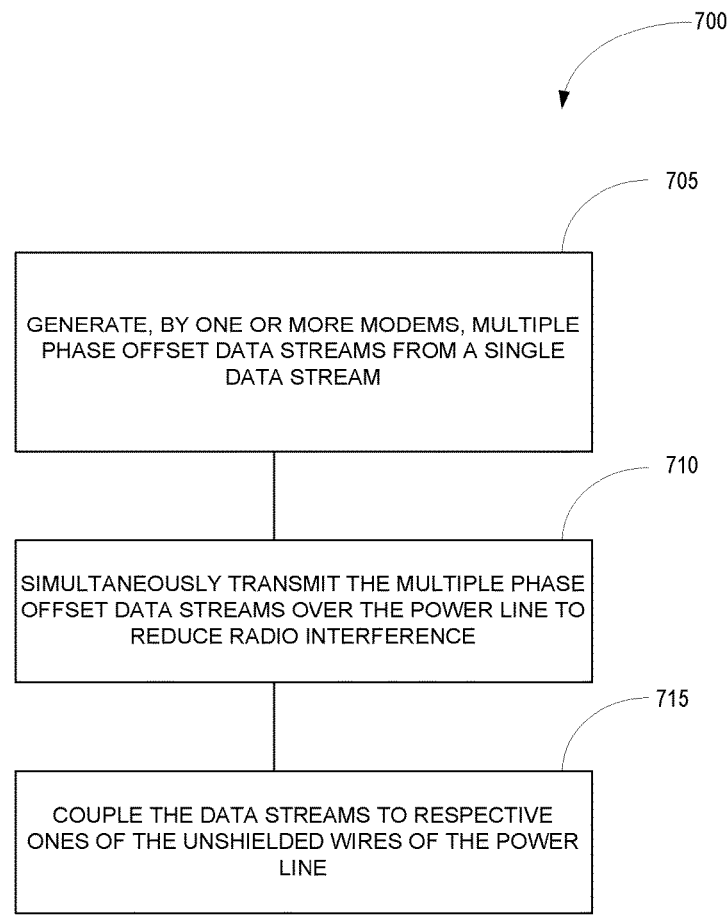
FIG. 15 illustrates an exemplary method for transmitting data over a ground power line.

FIG. 15 illustrates a method 700 implemented for transmitting data over a ground power line 520 having multiple unshielded wires. One or more BPL modems 530, 560 generate multiple phase offset data streams from a single data stream and simultaneously transmit the multiple phase offset data streams over the power line to reduce radio interference (block 705, 710). A coupling circuit 538, 568 couples the data streams output by the one or more BPL modems to respective wires of the power line (block 715).

In one example of the method 700, the BPL modems 530, 560 generate and transmit M phase offset data streams with a phase separation of $2\pi/M$ radians.

In another example of the method 700, a single BPL modem 530 or 560 generates and transmits three phase offset data streams with a phase separation of $2\pi/3$ radians.

In yet another example of the method 700, each of two BPL modems 530, 560 generate and transmit phase offset data streams with a phase separation of $2\pi/4$ or $2\pi/2$ radians.

In yet another example of the method 700, the coupling circuit 538, 568 inductively couples each data stream to a respective one of the unshielded wires of the power line with a transformer.

Figure 16:
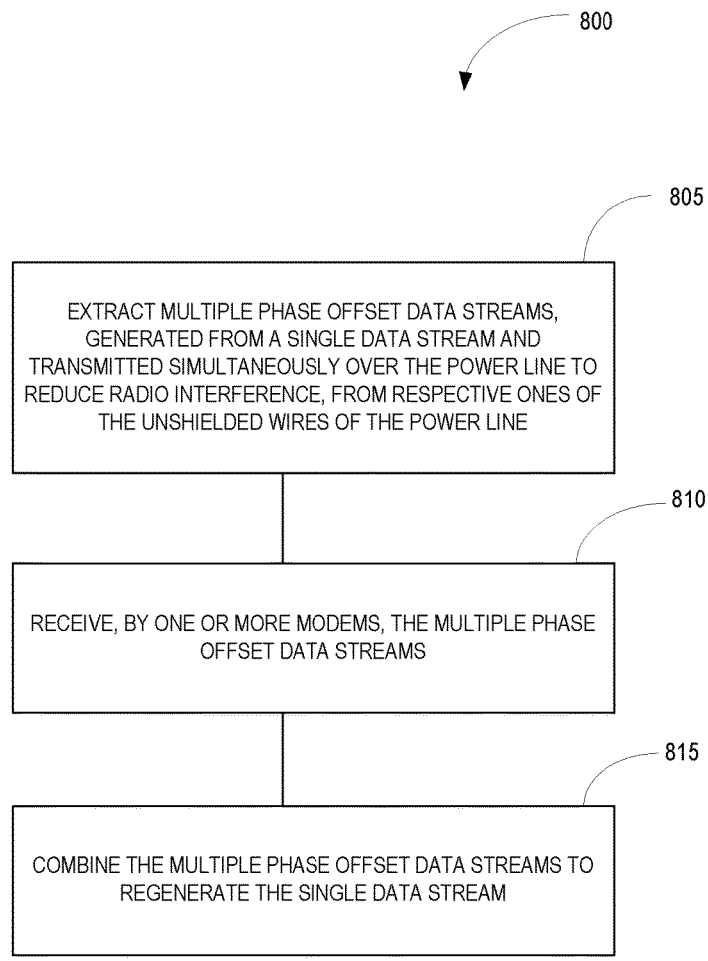
FIG. 16 illustrates an exemplary method for receiving data over a ground power line.

FIG. 16 illustrates a method 800 for receiving data over a ground power line 520 having multiple unshielded wires. A coupling circuit 538, 568 extracts multiple phase offset data streams, generated from a single data stream and transmitted simultaneously over the power line to reduce radio interference, from respective wires of the power line (block 805). One or more BPL modems 530, 560 receive the multiple phase offset data streams (block 810), and combine the multiple phase offset data streams to regenerate the single data stream (block 815).

In one example of the method 800, the BPL modems 530, 560 receive and combine M phase offset data streams with a phase separation of $2\pi/M$ radians.

In another example of the method 800, a single BPL modem 530 or 560 receives and combines three phase offset data streams with a phase separation of $2\pi/3$ radians.

In yet another example of the method 800, each of two BPL modems 530, 560 receive and combine two phase offset data streams with a phase separation of $2\pi/4$ or $2\pi/2$ radians.

In yet another example of the method 800, the coupling circuit 538, 568 extracts each of the phase offset data streams from a respective unshielded wire of the power line with a transformer inductively coupled to the unshielded wire.

Figure 17:
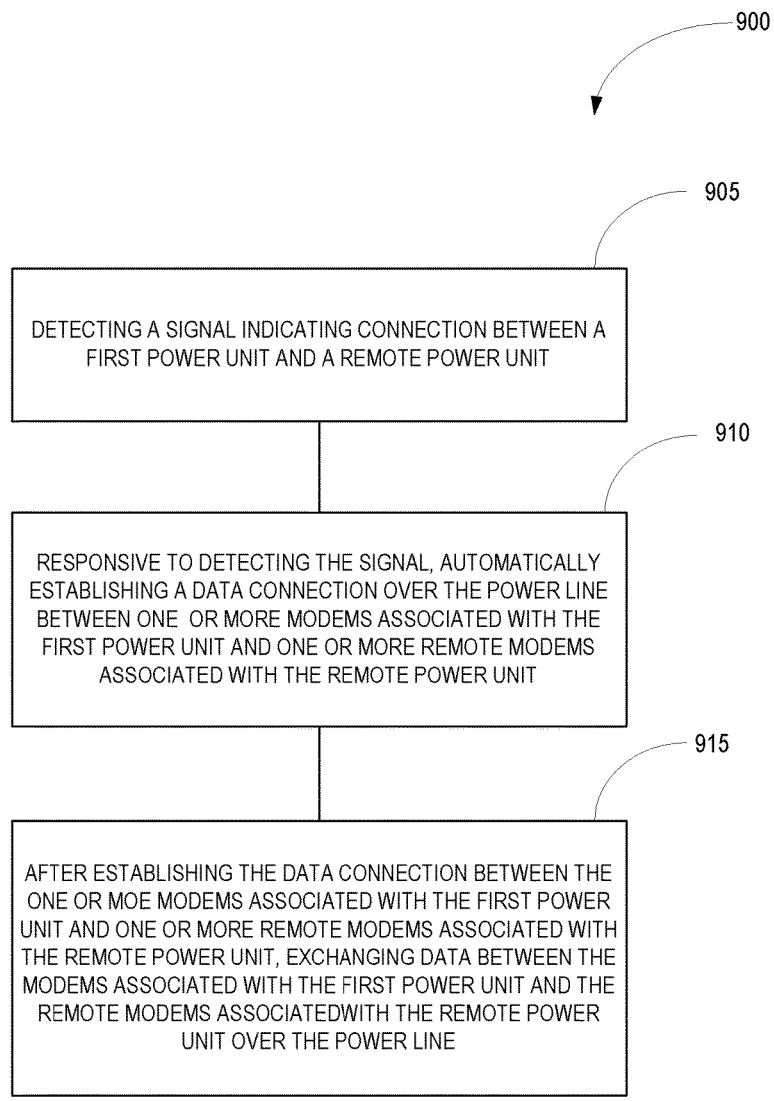
FIG. 17 illustrates an exemplary method for communicating data over a ground power line between a vehicle and a ground terminal.

FIG. 17 illustrates another method 900 implemented by the onboard power unit 500 in the aircraft 102 or the ground power unit 550. In one example of the method, the onboard controller 512 in the onboard power unit 500 (i.e., first power unit) detects a signal indicating connection between the onboard power unit 500 and the ground power unit 550 (i.e., remote power unit) (block 905). Responsive to detecting the signal, the one or more modems 530 associated with the onboard power unit 500 automatically establish a data connection with one or more modems 560 (i.e., one or more remote modems) associated with the ground power unit 550 (block 910). After establishing the connection between the one or more modems 530 in the onboard power unit 500 and the one or more modems 560 in the ground power unit 550, the one or more modems 530 in the onboard power unit 500 exchange data with the one or more modems 560 in the ground power unit 550 over the power line 520 (block 915).

In another example of the method shown in FIG. 17, the GPU controller 556 in the ground power unit 550 (i.e. first power unit) detects a signal indicating connection between the ground power unit 550 and the onboard power unit 500 (i.e., remote power unit) (block 905). Responsive to detecting the signal, the one or more modems 560 associated with the ground power unit 550 automatically establish a data connection with one or more modems 530 (i.e., one or more remote modems) associated with the onboard power unit 500 (block 910). After establishing the connection between the one or more modems 560 in the ground power unit 550 and the one or more modems 530 in the onboard power unit 500, the one or more modems 560 in the ground power unit 550 exchange data with the one or more modems 530 in the onboard power unit 500 over the power line 520 (block 915).

One example of the method further comprises electrically connecting a first subset of wires in the power line 520 (e.g., wires A, B, C and N) before electrically connecting a second subset of wires in the power line 520 (e.g., wires E and F). The onboard controller 512 in the onboard power unit 500 or the GPU controller 556 in the ground power unit 550 detects the signal indicative of the connection on one of the wires in the second subset of wires.

Another example of the method further comprises inductively coupling the one or more modems associated with the first power unit to respective wires in the first subset of wires using transformers. In one exemplary method 900 implemented by the onboard power unit 500, the one or more modems 530 in the onboard power unit 500 are inductively coupled to the power line 520 by transformers 540. In another exemplary method 900 implemented by the ground power unit 550, the one or more modems 560 in the ground power unit 550 are inductively coupled to the power line 520 by transformers 570.

In one example of the method 900 implemented by the ground power unit 550, the ground power unit 550 includes a contactor 554 disposed between the transformers 570 and the onboard power unit 500 in the aircraft 102. The ground power unit 550 enables the contactor 554 responsive to detecting a connection between the ground power unit 550 and onboard power unit 500, and disables the contactor 554 responsive to detecting loss of connection between the ground power unit 550 and onboard power unit 500.

Another aspect of the method comprises supplying power from a power circuit in the first power unit to the one or more modems. In one exemplary method 900 implemented by the onboard power unit 500, the onboard power supply 504 supplies power to one or more modems 530 in the onboard power unit 500. In another exemplary method 900 implemented by the ground power unit 550, the AC power supply 552 supplies power to one or more modems 560 in the ground power unit 550.

Another aspect of the method comprises temporarily interrupting, responsive to a predetermined event, the data exchange between the one or more modems 530 in the onboard power unit 500 and the one or more remote modems 560 in the ground power unit 550 while the onboard power unit 500 and the remote power unit 550 are still connected. The predetermined event may, for example, comprise an engine start test.

The airport communication network 100 as herein described provides end-to-end data connectivity between the aircraft 102 and the airline server 124, while maintaining security of the data communications. By using current transformers 540, 570 to couple the data streams onto the ground power line 520, crew safety is improved, especially in wet conditions. Also, no additional manpower or workload is required to connect and disconnect the BPL modems 530, 560, which are connected and disconnected automatically when the ground power line 520 is plugged into the aircraft 102.

What is claimed is:
1. A first power unit for a vehicle or ground terminal comprising:
    a connector configured to connect the first power unit to a remote power unit over a power line having a plurality of wires;

a power circuit configured to receive power from or provide power to the remote power unit over the power line;

a controller configured to detect connection between the first power unit and the remote power unit; and one or more modems configured to transmit and receive data over the power line when the first power unit is connected to the remote power unit, the one or more modems configured to:

automatically establish a data connection with one or more remote modems in the remote power unit over the power line in response to detection by the controller of the data connection between the first power unit and the remote power unit; and after establishing the data connection with one or more remote modems, exchanging data with the one or more remote modems over the power line.

2. The first power unit of claim 1 wherein the connector is configured to electrically connect a first subset of wires in the power line before electrically connecting a second subset of wires in the power line.

3. The first power unit of claim 2 wherein the controller is configured to detect a signal on a wire in the second subset of wires and to initiate the data connection by the one or more modems.

4. The first power unit of claim 3 further comprising one or more transformers configured to inductively couple the one or more modems to respective wires in the first subset of wires.

5. The first power unit of claim 4 further comprising a contactor disposed between the transformers and the connector, wherein the controller is further configured to:

enable the contactor responsive to detecting a connection between the first power unit and the remote power unit; and disable the contactor responsive to detecting loss of connection between the first power unit and the remote power unit.

6. The first power unit of claim 1 wherein the power circuit supplies power to the one or more modems.

7. The first power unit of claim 1 wherein the controller is further configured to, responsive to a predetermined event, temporarily interrupt the data exchange between the one or more modems and the one or more remote modems while the first power unit is still connected to the remote power unit.

8. The first power unit of claim 7 wherein the predetermined event comprises an engine start test.

9. The first power unit of claim 1 wherein the first power unit comprises an onboard power unit in a vehicle configured to receive power from a ground power unit.

10. The first power unit of claim 1 wherein the first power unit comprises a ground power unit configured to supply power to an onboard power unit in a vehicle.

11. A method, implemented by a first power unit for a vehicle or ground terminal, of communicating data over a power line connecting the vehicle with the ground terminal, the method comprising:

detecting a signal indicating connection between the first power unit and a remote power unit;

responsive to detecting the signal, automatically establishing a data connection over the power line between one or more modems associated with the first power unit and the one or more remote modems associated with the remote power unit; and after establishing the data connection between the modems associated with the first power unit and the one or more remote modems associated with the remote power unit, exchanging data between the modems associated with the first power unit and the one or more remote modems associated with the remote power unit.

12. The method of claim 11 further comprising electrically connecting a first subset of wires in the power line before electrically connecting a second subset of wires in the power line.

13. The method of claim 12 wherein detecting the signal indicating connection between the first power unit and the remote power unit comprises detecting a signal on one of the wires in the second subset of wires.

14. The method of claim 13 further comprising inductively coupling the one or more modems to respective wires in the first subset of wires using transformers.

15. The method of claim 14 wherein the first power unit comprises a contactor disposed between the transformers and the remote power unit, the method further comprising:

enabling the contactor responsive to detecting a connection between the first power unit and the remote power unit; and disabling the contactor responsive to detecting loss of connection between the first power unit and the remote power unit.

16. The method of claim 11 wherein the first power unit comprises a power circuit, the method further comprising supplying power from the power circuit to the one or more modems.

17. The method of claim 11 further comprising temporarily interrupting, responsive to a predetermined event, the data exchange between the one or more modems and the one or more remote modems while the first power unit is still connected to the remote power unit.

18. The method of claim 17 wherein the predetermined event comprises an engine start test.

19. The method of claim 11 wherein the first power unit comprises an onboard power unit in a vehicle configured to receive power from a ground power unit.

20. The method of claim 11 wherein the first power unit comprises a ground power unit configured to supply power to an onboard power unit in a vehicle.

* * * * *